United States Patent [19]

Takahashi et al.

[11] 4,263,592
[45] Apr. 21, 1981

[54] INPUT PEN ASSEMBLY

[75] Inventors: Hiromichi Takahashi; Tadaaki Sugino, both of Soka, Japan

[73] Assignee: Pentel Kabushiki Kaisha, Tokyo, Japan

[21] Appl. No.: 92,051

[22] Filed: Nov. 6, 1979

[51] Int. Cl.³ .................. G06F 3/14; G06K 15/20
[52] U.S. Cl. .................. 340/707; 340/709; 340/706; 340/146.3 SY; 178/18
[58] Field of Search .............. 340/706, 707, 708, 709, 340/710, 146.3 SY; 178/18, 19, 20

[56] References Cited

U.S. PATENT DOCUMENTS

| Re. 28,238 | 11/1974 | Koster | 340/707 |
|---|---|---|---|
| 3,189,889 | 6/1965 | Bridgett | 340/707 |
| 3,399,401 | 8/1968 | Ellis et al. | 340/710 |
| 3,498,692 | 3/1970 | Jewitt et al. | 340/707 |
| 3,932,862 | 1/1976 | Graven | 340/707 |
| 4,022,969 | 5/1977 | McKinlay et al. | 340/710 |
| 4,142,175 | 2/1979 | Herbst et al. | 340/146.3 SY |
| 4,158,747 | 6/1979 | Muller et al. | 340/146.3 SY |
| 4,184,044 | 1/1980 | Zwerenz | 178/18 |

FOREIGN PATENT DOCUMENTS 50-128421  11/1975  Japan .................. 178/18

*Primary Examiner*—Marshall M. Curtis
*Attorney, Agent, or Firm*—Robert E. Burns; Emmanuel J. Lobato; Bruce L. Adams

[57] ABSTRACT

An input pen assembly is provided which selectively cooperates with the screen of a cathode ray tube of a CRT display and the tablet of a tablet input device. The assembly automatically activates either one of the CRT display and the tablet input device in response to a change in the magnitude of a pressure applied by the pen against the screen of the CRT or the tablet. The input pen assembly includes an electrode which has its one end projecting forwardly of the front end of a casing and which is used for detecting a signal from the tablet. The electrode is formed with a through-opening which defines a light transmission path for a signal from the CRT display. Additionally the input pen assembly includes a spring which resiliently biases the electrode so that its front end projects forwardly of the front end of the casing, and a movable member which is disposed for movement with the electrode when the latter is retracted against the resilience of the spring. The movable member is movable between a first position corresponding to an initial position of the electrode where no pressure is applied thereto, a second position corresponding to a position assumed by the electrode when a given pressure is applied thereto as it is brought into abutment against the tablet, and a third position corresponding to a position assumed by the electrode as an increased pressure is applied thereto when it is brought into abutment against the screen of a cathode ray tube. Two of the three positions are associated with position detectors for detecting the extant position of the movable member. A logical combination of output signals from these position detectors provides a determination as to the position assumed by the electrode, thereby selectively activating the tablet input device or the CRT display.

7 Claims, 6 Drawing Figures

INPUT PEN ASSEMBLY

FIELD OF THE INVENTION

The invention relates to an input pen assembly, and more particularly, to such assembly which selectively cooperates with a tablet of a tablet input device of either capacitive or electromagnetic coupling type as well as a cathode ray tube display.

A cathode ray tube (hereafter referred to as CRT) display is extensively used as a terminal equipment for an information processing system such as an electronic computer. In addition to its function to display data from the computer on the screen of CRT, such CRT display is capable of indicating a particular point of information displayed on the CRT (picking) or inputting fresh information (pointing and tracking) by means of a light pen. Hence, by its combined use with a light pen, a CRT display has the both function of displaying and inputting/outputting data, which can be advantageously utilized in editing or deleting part of the data.

On the other hand, a tablet input device is recently finding its use as an input/output device for an information processing system, and includes a figure input device which is capable of inputting a hand-written figure and a key input device which is used to input characters such as letters or numerals. The both input devices are similar in their principle of operation, and include a tablet and a probe or a signal pen, the position of which on the tablet is digitized. With such a tablet input device, a signal may be transmitted between the probe and the tablet in various manners including a capacitive, an electromagnetic, an optical, and a ultrasonic coupling. The tablet and the probe are related to each other so that one of them acts as a signal transmitter while the other acts as a receiver. These input devices are well known and hence will not be described in detail herein. However, considering a capacitive type briefly, a number of conductors are disposed on a substrate along X- and Y-axes, with each intersection between the both perpendicular conductors defining a display segment, thereby forming a tablet. A detecting pen or probe may be capacitively coupled with conductors of each pair associated with any particular display segment of the tablet, thereby detecting a flow of pulse through the pair of conductors. The resulting pulse is digitized by a control circuit to define the position of that segment.

As compared with a conventional keyboard of push-button type, the tablet key input device has the advantage that the number of input keys can be drastically increased with a facilitated operation. Hence it will be appreciated that a combination of a CRT display and a tablet input device greatly facilitates an inputting, an editing or deletion of information. By way of example, information from the tablet input device may be displayed on the screen of the CRT display, and can be corrected or additional data inputted on the displayed information by means of a light pen. The correction or addition of such information is frequently required in the processing of an increased amount of data as in a Chinese character processing system or an inventory control system. In the prior art practice, an input pen of an optical coupling type such as a light pen is used in association with a CRT display while a variety of input pens are used with a tablet input device depending on the type of the tablet used. Thus two input pens are required for use with these devices. However, a discriminative use of these two distinct input pens depending on the intended operation disadvantageously reduces a working efficiency.

DESCRIPTION OF THE PRIOR ART

Japanese Laid-Open Patent Application Ser. No. 50-128,421 laid open Nov. 10, 1975 and assigned to the common assignee as the present invention, discloses an input pen assembly which is capable of operating with both a CRT display and a tablet input device of a capacitive coupling type. The input pen assembly disclosed comprises a hollow cylinder of an electrically conductive material having its one end projecting from the front end of a casing and which defines a detector rod for sensing a pulse capacitively from an associated tablet, a light acceptor element disposed at a given spacing from the rear end of the detector rod and receiving light from a CRT display which is passed through the hollow interior of the detector rod, bias means for resiliently urging the detector rod so that its front end normally projects beyond the front end of the casing, and a switch which is operated as the detector rod is retracted against the bias. The detector rod is electrically connected with a tablet input device while the light acceptor element is electrically connected with a CRT display. The switch is turned on when the rod is retracted, activating both the CRT display and the tablet input device, which are supplied with signals from the light acceptor element and the detector rod. A disadvantage with this arrangement is that when a given pressure is applied to the input pen, both the CRT display and the tablet input device are rendered operative. This might cause a malfunctioning of the CRT display in response to the existence of any reflected light upon the tablet as the input pen is pressed against the tablet, or may cause the likelihood that a stray electric field existing in the vicinity of the CRT display may be applied to the tablet as extraneous information.

SUMMARY OF THE INVENTION

It is an object of the invention to provide an input pen assembly capable of operating with both a CRT display and a tablet input device, which are selectively operated by a differential pressure applied by the front end of the pen against such devices.

In accordance with the present invention, there is provided an input pen assembly for selective cooperation with the screen of a cathode ray tube of a CRT display and the tablet of a tablet input device, comprising a tubular casing having an opening formed in its front end, a rod-shaped electrode slidably disposed in the opening for deriving a signal from the tablet, the electrode extending axially of the casing and being formed with a through-opening which defines a transmission path for a CRT signal, bias means for resiliently urging the detector electrode so that one end of the rod-shaped electrode normally projects forwardly of the front end of the casing, a light acceptor element disposed within the casing in spaced relationship with the other end of the electrode in order to receive the CRT signal which passes through the through-opening of the rod-shaped electrode, a support plate disposed within a rear portion of the casing for supporting the light acceptor element, a movable member disposed within the casing and movable with the rod-shaped electrode between three positions including a first position corresponding to an initial position of the electrode which is assumed when no pressure is applied to the electrode to cause it to retract within the casing, a second position corresponding to a position of the electrode which is assumed when it is retracted under a given pressure, and a third position corresponding to a position of the electrode which is assumed when it is further retracted under an increased pressure applied thereto, means for operatively connecting the rod-shaped electrode with the movable member, a first and a second position detector for detecting the position of the movable member, the position detectors being associated with selected two of the first to the third position, and a control circuit responsive to signals from the first and the second position detector for determining the position of the movable member, the control circuit activating either one of the CRT display and the tablet input device whenever the movable member assumes said second position and activating the other of the CRT device and the tablet input device whenever the movable member assumes the third position.

In accordance with the invention, the rod-shaped electrode which cooperates with a tablet signal is formed with the through-opening to pass a signal which is associated with the CRT display. A tablet input device or a CRT display is selectively operated in response to a differential magnitude of the pressure that is applied to the electrode. Hence, when a pressure which is required for a tablet operation is applied to the electrode while operating the tablet input device, any extraneous optical signal which may impinge on the light acceptor element cannot cause a malfunctioning of the CRT display inasmuch as the latter is not rendered operative. Conversely, when the input pen assembly of the invention is effectively used with the CRT display, the detection of any stray signal by the electrode cannot cause a malfunctioning of the tablet input device.

Above and other objects and features of the invention will become apparent from the following description of a preferred embodiment thereof with reference to the drawings. It is to be understood that since a tablet input device and a CRT display are both well known in the art, they are not specifically described. In addition, a tablet input device of a capacitive coupling type is illustrated, but it should be understood that the invention is equally applicable to tablet input devices of other types.

DESCRIPTION OF PREFERRED EMBODIMENT

Figure 1:
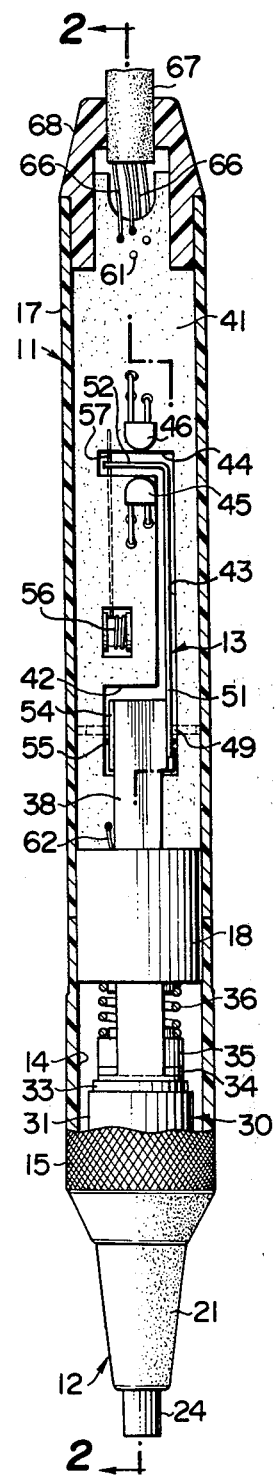
FIG. 1 is a plan view, partly in section, of an input pen assembly according to one embodiment of the invention.
Figure 2:
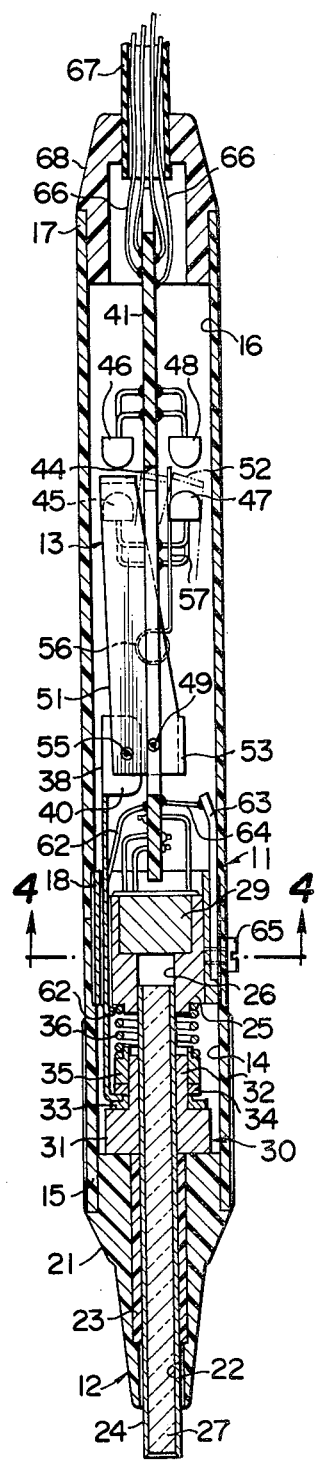
FIG. 2 is a cross section taken along the line 2—2 shown in FIG. 1.

Referring to FIGS. 1 and 2, the input pen assembly of the invention includes a casing 11, a signal detector 12 which is mounted on the front end portion of the casing 11, and a switching arrangement 13 which is disposed within the casing 11 and is mechanically associated with the signal detector 12. The casing 11 is formed of an electrically conductive synthetic resin or a metal and is divided into a front cylinder 15 having a central bore 14 therein, and a rear cylinder 17 having a central bore 16 formed therein which is of the same diameter as the bore 14. A cylindrical joint member 18 is threadably engaged with the rear portion of the front cylinder 15 and with the front portion of the rear cylinder 17, and allows the front and rear cylinders 15, 17 to be assembled together so that their end faces are in abutment against each other.

Figure 3:
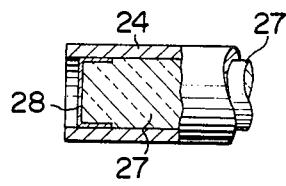
FIG. 3 is a fragmentary plan view, partly in section, of a detector electrode shown in FIG. 1.

The signal detector 12 includes a substantially conical ferrule 21 which has its cylindrical rear end fitted into the front end of the cylinder 15. The ferrule 21 is formed of an insulating synthetic resin, and can be secured with the cylinder 15 by a threadable engagement or by a press fit. The ferrule 21 is formed with an axially extending through-opening 22 which is aligned with the axis thereof, and an insulating sleeve 23 is fixedly mounted therein. The axial length of the insulating sleeve 23 is less than that of the ferrule 21 and the rear end of the insulating sleeve 23 is disposed flush with the rear end of the ferrule 21. A hollow pipe-shaped detector electrode 24 is slidably disposed to extend through the opening 22, with its rear end extending into the central bore 14 of the front cylinder 15 and slidably received within an opening 26 formed in a stationary member 25 which is fixedly mounted within the joint member 18. The detector electrode 24 is formed of an electrically conductive metal, and detects a pulse signal from a tablet when it is disposed in abutment against the tablet. The detector electrode 24 is made hollow to pass light from the CRT display. However, it is preferred that a light conducting medium such as an optical fiber is fixedly disposed within the hollow portion of the electrode 24 as by a press fit or adhesion. As shown in FIG. 3, the front end of the medium 27 is slightly recessed within the detector electrode 24 and is coated by a transparent, conductive film 28 such as Mesa film. By electrically connecting the conductive film 28 and the detector electrode 24 together, the area of the front end of the detector electrode 24 can be substantially increased, thus permitting a reliable detection of a pulse signal from the tablet. The electrical connection between the conductive film 28 and the detector electrode 24 is achieved by a direct contact therebetween as the medium 27 is disposed in a press fit therein, or by the use of an electrically conductive adhesive. The front end of the detector electrode 24 projects forwardly of the front end of the ferrule 21, but can be retracted upon abutment against the tablet or the screen of the CRT display. The rear end of the opening 26 has an increased diameter than the front portion thereof, and a light acceptor element 29 such as a phototransistor is disposed in the rear portion, with its light impinging surface directed toward the medium 27 in order to convert the light input into a corresponding electrical signal.

The switching arrangement 13 includes a detent member 30 which is disposed within the central bore 14 of the cylinder 15 and mounted on the detector electrode 24 for movement therewith. The detent member 30 includes a front portion 31 of an increased diameter which is located adjacent to the ferrule 21, and a rear portion 32 of a reduced diameter which is located adjacent to the stationary member 25, both of which are integrally formed. The detent member 30 is formed with a central bore for passing the detector electrode 24 therethrough. The detent member 30 is formed of a conductive metal or synthetic resin, and is electrically connected with the detector electrode 24 when the latter is a press fit in the central bore thereof. Alternatively, the detent member 30 can be electrically connected with the detector electrode 14 by the use of an electrically conductive adhesive which secures the electrode therein.

A pair of insulating rings 33, 34 are fitted over the rear portion 32 of the detent member 30, and a conductive spring abutment 35 is disposed thereon by a press fit or by the use of a conductive adhesive. In this manner, the rear portion 32 is electrically connected with the spring abutment 35. A coiled spring 36 formed of a conductive metal is interposed between the spring abutment 35 and the stationary member 25 for urging the detent member 30 downward until the front end of the front portion 31 of the detent member 30 bears against the rear end face of the ferrule 21. As a consequence, the front end of the detector electrode 24 projects forwardly of the front end of the ferrule 21 unless the detector electrode 24 is disposed in abutment against the tablet or the CRT display. A pulse signal from the tablet which is detected by the electrode 24 is passed through the detent member 30, the spring abutment 35 and the coiled spring 36.

Figure 4:
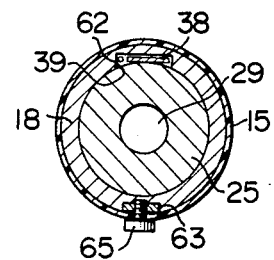
FIG. 4 is a cross section taken along the line 4—4 shown in FIG. 2.

The switching arrangement 13 also includes a drive arm 38 having its folded end disposed in a clearance between the insulating rings 33, 34. The drive arm 38 extends into the central bore 16 of the rear cylinder 17 by passing through a groove 39 (see FIG. 4) which is formed axially in the internal surface of the joint member 18. The drive arm 38 comprises a metal strip, with its major surface disposed in opposing relationship with the axis of the central bore 16. The opposite end of the drive arm 38 which is located within the central bore 16 is formed with a pair of downwardly depending ears 40, as viewed in FIG. 2, on its opposite sides. A printed board 41 having a width which is substantially equal to the diameter of the central bore 16 is disposed in the rear cylinder 17, with its major surface lying parallel to the major surface of the drive arm 38. The printed board 41 is secured to the rear cylinder 17 by a press fit or by adhesion. The light acceptor element 29 is mounted on the forward end of the printed board 41. As shown more clearly in FIG. 1, the board 41 is formed with a rectangular opening 42, an elongate groove 43 which extends from the opening 42 toward the rear end of the board 41, and an end groove 44 which extends at right angles to the groove 43, substantially in the diametrical direction of the bore 16. A light emitting element 45 such as light emitting diode and a light acceptor element 46 such as a photodiode, which is turned on or off in response to a light input to the element 45, are disposed on one surface of the board 41 on the opposite sides of the end groove 44. Similarly, another light emitting element 47 and light acceptor element 48 are disposed on the opposite surface of the board 41. The light acceptor elements 46, 48 are adapted to produce a high level signal "1" when they receive light input and to produce a low level signal "0" in the absence of such light input.

A shaft 49 extends through the opening 42 in the diametrical direction of the bore 16 and has its opposite ends supported by the board 41. A shutter member 51 has its one end rotatably mounted on the shaft 49, and may comprise a metal strip. To enable its passage through the end groove 44, the shutter member has its surface disposed at right angles to the plane of the printed board 41. The shutter member 51 has a gradually decreasing width toward its rear end, and includes a rear end 52 which is folded so as to extend through the end groove 44 and which has a sufficient width to shield only one of the light acceptor elements 46 and 48. The end of the shutter member 51 which is located nearer the shaft 49 is integrally formed with a bottomplate 53 and a sideplate 54 which upstands from the other end of the bottomplate 53, the shaft 49 also extending through the sideplate 54.

Another shaft 55 extends across this end of the shutter member 51 and the sideplate 54, and is disposed spaced from but parallel to the shaft 49. The both ears 40 of the drive arm 37 are loosely mounted on the shaft 55. Specifically, when the detector electrode 24, and hence the drive arm 38, is retracted by abutment against the tablet or the CRT display, the shutter member 51 is angularly movable about the shaft 49. A coiled spring 56 is mounted on the board 41, and has its one end 57 extending along the other surface (invisible in FIG. 1) of the board 41 and across the end groove 44. The purpose of the coiled spring 56 is to assure that the rear end 52 of the shutter member 51 is located intermediate the upper light acceptor element 46 and the lower light acceptor element 48 so that the both elements are capable of receiving light from their associated light emitting elements 45, 47 when an initial pressure of a given magnitude is applied to the detector electrode 24.

Normally when no pressure is applied to the detector electrode 24, the coiled spring 36 urges the detent member 30 until its front end bears against the rear end face of the ferrule 21. Hence, the front end of the detector electrode 24 projects forwardly of the front end of the ferrule 21 as shown in FIGS. 1 and 2 while the rear end 52 of the shutter member 51 is located intermediate the light emitting element 45 and the light acceptor element 46. Hence, the element 46 outputs "0". On the other hand, the lower light acceptor element 48 receives light from the element 47 to output "1". When the detector electrode 24 is retracted against the bias of the spring 36 until the rear end of the shutter member 51 bears against the end 57 of the coiled spring 56 as a result of the abutment of the front end of the detector electrode 24 against a fixed surface, the end 52 of the shutter member 51 will be located intemediate the light acceptor elements 46, 48, whereby both of these elements produce "1" outputs. As the pressure is increased to cause a further retraction of the detector electrode 24, the end 52 of the shutter member 51 will move into a position between the lower light emitting element 47 and the light acceptor element 48 while expelling the end 57 of the spring 56. In response thereto, the output of the light acceptor element 48 changes from "1" to "0" while the upper element 46 maintains "1" output. In this manner, the output signals from the two light acceptor elements 46, 48 assume three different combinations in accordance with the position of the detector electrode 24. In the present embodiment, the combination of "0" output from the element 46 and "1" output from the element 48 represents a condition of the detector electrode 24 in which it bears against neither the tablet nor the screen of the CRT display. The combination of both "1" outputs from the elements 46, 48 represents the abutment of the free end of the detector electrode 24 against the tablet while the combination of "1" output from the element 46 and "0" output from the element 48 represents the abutment of the free end of the detector electrode 24 against the screen of the CRT display.

Consequently, when it is desired to input a pulse signal from the tablet, it is necessary to apply a pressure to the detector electrode which is greater than the magnitude of the bias applied by the coiled spring 36 but which is less than the magnitude of the bias applied by the coiled spring 56 so that the rear end 52 of the shutter member 51 is located intermediate the light acceptor elements 46, 48. When an entry of the information displayed by the CRT display is desired, a pressure is applied to the detector electrode 24 which exceeds the magnitude of the bias supplied by the coiled spring 56, thus causing the rear end 52 of the shutter member 51 to block the light acceptor element 48. In the preferred embodiment, the two springs 36, 56 are chosen such that a pressure of about 50 g is required to cause the abutment of the detector electrode against the tablet while a pressure of about 150 g is required to cause the abutment against the CRT display.

It is to be understood that an electrical circuit (not shown) associated with the detector electrode 24, the light acceptor elements 29, 46, 48 and the light emitting elements 45, 47 is printed on the underside of the printed board 41. Hence, it should be understood that these electrical elements are electrically connected with respective pins 61 which are disposed on the rear portion of the printed board 41. As mentioned previously, the signal from the detector electrode 24 is transmitted through the coiled spring 36, and hence a lead wire 62 having its one end connected with the spring 36 is passed through the groove 39 formed in the joint member 18 so that its other end is connected with the pin (not shown) on the printed board 41. It is to be noted that the light acceptor element 29 may be peripherally covered with an insulating material and the stationary member 25 may be formed of an electrically conductive material so that the signal from the detector electrode 24 which is transmitted to the coiled spring may be taken out of the stationary member. Hence, a lead wire may have its one end connected with the rear end face of the stationary member and its other end connected with a printed circuit on the board 41.

In order to capacitively shield the interior of the front and rear cylinders 15, 17 from an external electric field, a strip-shaped conductive plate 63 is provided. The conductive plate 63 has its one end secured to the internal surface of the front cylinder 15 at its rear end and has its other end extending below the printed board 41 while contacting the internal surface of the rear cylinder 17 over its front region. The other end of the conductive plate 63 is secured with one end of a lead wire 64, the other end of which is connected with a ground line, not shown, of a printed circuit provided on the underside of the board 41. An axially extending groove is formed in the outer surface of the joint member 18 for fitting the conductive plate 63 therein, whereby the latter contacts the joint member to provide a reliable shielding effect upon the central bore which is surrounded by the ferrule 21, the front and rear cylinders 15, 17 and the joint member 18. The conductive plate 63 is secured between the front cylinder 15 and the joint member 18 by a screw 65 which is externally applied to the rear end of the front cylinder 15. Respective pins 61 on the printed board 41 are connected with corresponding lead wires 66, which are bundled together by an insulating cover 67 for connection with information input device to be described later. A cap 68 formed of an insulating synthetic resin is fitted into the rear opening of the rear cylinder 17. The cap 68 is centrally formed with an opening for passing the lead wires 66 which are bundled together by the covering 67.

Figure 5:
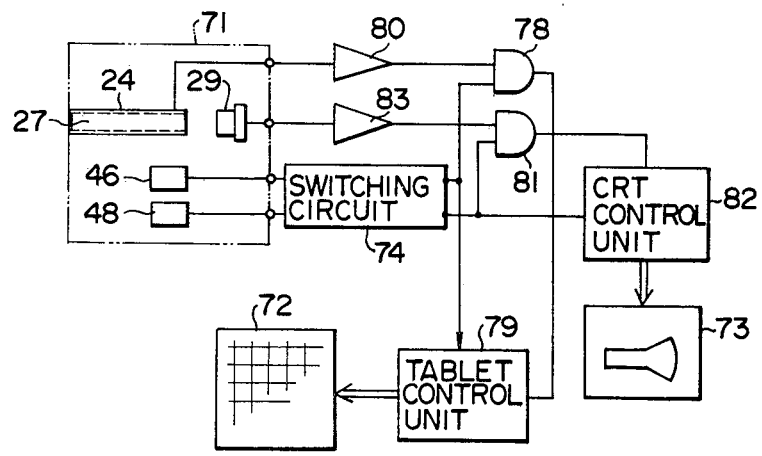
FIG. 5 is a block diagram of one example of information input device in which the input pen assembly of the invention is incorporated.

FIG. 5 is a block diagram of one form of information input device which is adapted to be used with the input pen assembly. An input pen assembly as described above is generally indicated within a phantom line block designated by reference numeral 71. The construction of information input device as well as its operation when the input pen assembly 71 is brought into abutment against a tablet of a tablet input device 72 and when it is brought into abutment against the screen of a CRT display 73 will now be described.

Figure 6:
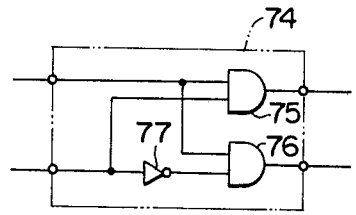
FIG. 6 is a circuit diagram illustrating a specific example of a switching circuit shown in FIG. 5.

Outputs from the light acceptor elements 46, 48 of the input pen assembly 71 are fed to a switching circuit 74. As clearly shown in FIG. 6, the switching circuit 74 comprises a pair of two input AND gates 75, 76 and an inverter 77. AND gate 75 has its both inputs connected to receive the outputs from the elements 46, 48 while AND gate 76 has its one input connected with the output from the element 46 and its other end connected to receive the output from the element 48 through the inverter 75. When the detector electrode 24 of the input pen assembly 71 is not brought into abutment against the tablet or the screen of CRT, the element 46 outputs "0" while the element 48 outputs "1". As a result, inputs "0" and "1" are applied to AND gate 75 while both "0"s are applied to AND gate 76. Consequently, both AND gates 75, 76 output "0". If the detector electrode 24 is now brought into abutment against the tablet of the tablet input device 72 with a small pressure, the both elements 46, 48 output "1". Consequently, AND gate outputs "1" while AND gate 76 outputs "0". Then, if the detector electrode 24 is brought into abutment against the screen of the CRT display 73 with a pressure which is increased than the corresponding value when it abuts against the tablet, the element 46 outputs "1" while the element 48 outputs "0". Consequently, AND gate 75 outputs "0" while AND gate 76 outputs "1". Thus, it will be seen that AND gate 75 provides a "1" output when the detector electrode is brought into abutment against the tablet while AND gate 76 provides a "1" output when it is brought into abutment against the screen of the CRT display. These output signals from AND gates 75, 76 can be utilized as an on/off switching signal from the input pen assembly in the same manner as used with a conventional input pen or light pen.

The output of AND gate 75 in the switching circuit 74 is fed to one input of another two input AND gate 78 and also to a tablet control unit 79. AND gate 78 receives its other input from the output of the detector electrode 24 which is fed through an amplifier 80. The output of AND gate 78 is connected with the tablet control unit 79. The tablet control unit 79 operates in the same manner as a conventional input control unit in that it activates the tablet input device 72 and also passes a signal detected by the detector electrode 24 and gated through AND gate 78 to the input device 72 in response to an output signal from AND gate 75 in the switching circuit 74.

The output of AND gate 76 of the switching circuit 74 is fed to one input of a further two input AND gate 81 and also to a CRT control unit 82. AND gate 81 receives its other input from the light acceptor element 29 which feeds its output through an amplifier 83. The output of AND gate 81 is connected with the CRT control unit 82. The CRT control unit 82 operates in the same manner as an input control unit of a conventional CRT display in that it activates the CRT display 73 and passes an output signal from the light acceptor element 29, which detects a light signal on the screen of the CRT display through the light transmitting medium 27, to the display 73.

From the foregoing description, it will be noted that the outputs from AND gates 75, 76 are either both "0"s or only one of them is "1" while the other is "0". In other words, when the detector electrode 24 is brought into abutment against the tablet, the tablet control unit 79 is activated in response to an output from AND gate 75 while AND gate 76 provides a "0" output, which disables the CRT control unit 82.

When the tablet and the input pen is optically coupled to provide a signal transmission therebetween, the detector electrode 24 may merely serves as a light transmitting medium. Hence, the light acceptor element 29 may be shared for the light detection from both the tablet and the CRT display. In this instance, in the circuit arrangement of FIG. 5, the output of the element 29 is fed to both amplifiers 80 and 83.

While a preferred embodiment of the invention has been illustrated and described above, it should be understood that a number of modifications and changes will occur to those skilled in the art without departing from the spirit and scope of the invention as defined by the appended claims. By way of example, the light emitting elements 45, 47 and the light acceptor elements 46, 48 which constituted the switching arrangement 13 may be replaced by reed switches which are located at the positions of the elements 46, 48 and which are turned on and off by a permanent magnet which is mounted on the rear end of the shutter member 51, thus achieving the same effect as mentioned above.

What is claimed is:

1. An input pen assembly for selective cooperation with the screen of a cathode ray tube of a CRT display and the tablet of a tablet input device; comprising a tubular casing having an opening formed in its front end, a rod-shaped electrode slidably disposed in the opening for deriving a signal from the tablet, the electrode extending axially of the casing and being formed with a through-opening which defines a transmission path for a CRT signal, bias means for resiliently urging the detector electrode so that one end of the rod-shaped electrode normally projects forwardly of the front end of the casing, a light acceptor element disposed within the casing in spaced relationship with the other end of the electrode in order to receive the CRT signal which passes through the through-opening of the rod-shaped electrode, a support plate disposed within a rear portion of the casing for supporting the light acceptor element, a movable member disposed within the casing and movable with the rod-shaped electrode between three positions including a first position corresponding to an initial position of the electrode which is assumed when no pressure is applied to the electrode to cause it to retract within the casing, a second position corresponding to a position of the electrode which is assumed when it is retracted under a given pressure, and a third position corresponding to a position of the electrode which is assumed when it is further retracted under an increased pressure applied thereto, means for operatively connecting the rod-shaped electrode with the movable member, a first and a second position detector for detecting the position of the movable member, the position detectors being associated with selected two of the first to the third position, and a control circuit responsive to signals from the first and the second position detector for determining the position of the movable member, the control circuit activating either one of the CRT display and the tablet input device whenever the movable member assumes said second position and activating the other of the CRT device and the tablet input device whenever the movable member assumes the third position.

2. An input pen assembly according to claim 1, further including means for causing the rod-shaped electrode to move to the second position against the bias when the given pressure is applied thereto and for causing the movable member to move to the third position when the increased pressure is applied to the electrode.

3. An input pen assembly according to claim 1 in which said means for operatively connecting the rod-shaped electrode with the movable member comprises a horizontal link member having its one end connected with the rod-shaped electrode and its other end extending toward the rear end of the casing for axial movement by cooperation with the axial movement of the electrode, and a pivotal member having its one end pivotally mounted on the support plate and having the movable member mounted on its other end, said one end of the pivotal member being loosely connected with the other end of the horizontal link member.

4. An input pen assembly according to claim 1 in which each of the first and the second position detector comprises a light emitting element and a light acceptor element both of which are carried by the support plate, the movable member being formed as a shutter member which blocks a path between associated light emitting and light acceptor elements.

5. An input pen assembly according to claim 1 in which the first position detector is related to the first position while the second position detector is related to the third position, and wherein the control circuit comprises a first AND gate receiving the outputs from the first and the second position detector as its inputs, an inverter which operates to invert either output from the first and the second position detector, and a second AND gate receiving the output from the other position detector and the output of the inverter, the respective outputs of the first and second AND gates selectively activating the CRT display or the tablet input device.

6. An input pen assembly according to claim 2 in which said moving means comprises a resilient member having its one end connected with the plate, the other end of the resilient member being adapted to engage the movable member at the second position, the resilient member exhibiting a resilience which is greater than the magnitude of said bias and which is less than the magnitude of said increased pressure.

7. An input pen assembly according to claim 4 in which the first and the second position detector are mounted on the opposite sides of the support plate which is formed with a slit for allowing the passage of the movable member therethrough.

* * * * *